United States Patent
Mills

(10) Patent No.: US 6,846,432 B2
(45) Date of Patent: Jan. 25, 2005

(54) REMOVAL OF PHOSPHATE FROM WATER

(75) Inventor: Dudley John Mills, 30 Hutchison Crescent, Kambah, ACT, 2611 (AU)

(73) Assignees: Innovez Pty Ltd., Fisher (AU); Dudley John Mills, Kambah (AU)

( * ) Notice: Subject to any disclaimer, the term of this patent is extended or adjusted under 35 U.S.C. 154(b) by 108 days.

(21) Appl. No.: 10/193,063

(22) Filed: Jul. 12, 2002

(65) Prior Publication Data

US 2003/0010722 A1 Jan. 16, 2003

(30) Foreign Application Priority Data

Jul. 16, 2001 (AU) .............................................. PR6385
Sep. 25, 2001 (AU) .............................................. PR7880
Jan. 8, 2002 (AU) .............................................. PR9850

(51) Int. Cl.$^7$ .............................................. C02F 1/58
(52) U.S. Cl. .................. 252/180; 210/729; 210/906; 534/15; 534/16
(58) Field of Search .............................. 210/716, 717, 210/725, 727, 728, 729, 732, 906; 252/180, 181; 534/15, 16

(56) References Cited

U.S. PATENT DOCUMENTS

| | | | | |
|---|---|---|---|---|
| 4,242,232 A | * | 12/1980 | Sylvester et al. | 502/102 |
| 4,461,883 A | * | 7/1984 | Takeuchi et al. | 526/139 |
| 4,747,975 A | * | 5/1988 | Ritter | 134/41 |
| 4,778,671 A | * | 10/1988 | Wusirika | 423/592.1 |
| 5,202,130 A | * | 4/1993 | Grant et al. | 424/617 |
| 5,597,484 A | * | 1/1997 | Tolley et al. | 210/611 |
| 5,683,953 A | | 11/1997 | Mills | 502/405 |
| 5,783,676 A | * | 7/1998 | Yunlu | 534/15 |
| 5,801,277 A | * | 9/1998 | Sumida et al. | 562/583 |
| 6,054,563 A | * | 4/2000 | Alas et al. | 534/16 |
| 6,111,082 A | * | 8/2000 | Yunlu et al. | 534/16 |
| 6,524,487 B2 | * | 2/2003 | Kulperger et al. | 210/723 |

FOREIGN PATENT DOCUMENTS

WO  WO 01/62673 A1  8/2001

* cited by examiner

Primary Examiner—Peter A. Hruskoci
(74) Attorney, Agent, or Firm—Sidley Austin Brown & Wood LLP

(57) ABSTRACT

Methods and compositions for removing phosphate from swimming pool waters are disclosed. The compositions include both soluble and substantially insoluble lanthanide carboxylates, preferred examples being lanthanum glycolate and lactate. The methods include the addition of the lanthanide compounds to the bulk of the pool water, but preferably involve the loading of the pool filter with the composition and the circulation of pool water through the filter to effect the removal of dissolved phosphate in the water.

8 Claims, 2 Drawing Sheets

Phosphate Concentration in 44kL Sand Filtered Pool vs Pump Time
2 x 100 g La(Gly)3 added to Inlet

REMOVAL OF PHOSPHATE FROM WATER

TECHNICAL FIELD

This invention relates to preparations and methods for use in removing phosphates from water, especially swimming pool water, to assist in the control of algal growth. It is more particularly concerned with improvements to our prior U.S. Pat. No. 5,683,953 [hereafter called 'our prior patent'] in which we disclosed the use of substantially insoluble lanthanide salts to sequester phosphate from swimming pool water.

The preparations of the present invention include solutions of lanthanide carboxylates, substantially insoluble particulate (powdered, crystalline, granular and the like) lanthanide carboxylates and aqueous suspensions of such particulate lanthanide carboxylates. The invention is concerned with the composition and preparation of such materials, and with methods for their use.

In this specification, the term 'lanthanide' includes the chemical elements yttrium, lanthanum and the chemical elements of atomic number 58 to 70 inclusive (cerium to ytterbium). The term, 'substantially insoluble' means finite solubility of less than about 10% [~100 g/l] in water at normal temperature and pressure. The term 'carboxylate(s)' means the salt(s) of organic acid(s) containing one or more carboxylic (—COOH) groups per molecule. The term 'carbonate' means both specifically the carbonate anion $CO_3^{2-}$ and more inclusively carbon dioxide dissolved in water, di-hydrogen carbonate ($H_2CO_3$), the hydrogen carbonate or bicarbonate anion ($HCO_3^-$) and the carbonate anion.

The materials and methods of the invention are applicable to the treatment of water in swimming pools, ponds, fountains, cooling towers and the like where water is circulated by pumps through filters and where algal growth is likely to be unpleasant or unhealthy for humans.

BACKGROUND TO THE INVENTION

In our prior patent we disclosed methods of removing phosphate from swimming pool water using substantially insoluble particulate lanthanide compounds.

Although the lanthanide compounds are not toxic to algae—and, in fact, non-bio-active in the concentrations employed—we had found that the reduction of pool phosphate concentration to less than about 100 parts per billion (ppb) so nutritionally stressed the algae that normal concentrations of normal pool sanitizers such as chlorine were lethal to algae and provided effective control. This was also disclosed in our prior patent. We also disclosed in our prior patent the method of removing phosphate from pool water in which particulate lanthanide compounds were formed in situ in the pool filter, or were pre-formed and loaded into the pool filter so that phosphate is removed as water is circulated through the filter.

These methods avoided the excessive turbidity or cloudiness that results from mixing lanthanum chloride [solubility about 50%] directly into the pool because of the very fine suspension of precipitated lanthanum phosphate and lanthanum carbonate particles that results. It can take weeks of continuous filtering before the clarity of the pool water is returned to a satisfactory level because many of the lanthanide particles are so fine that they can pass through sand filters. Not only is this level of turbidity and pumping commercially unacceptable, but the lanthanide phosphate particles in the main body of water continue to provide a source of phosphate for algae, albeit at reduced availability, so long as they and the algae are exposed to light. [When retained in the dark within the filter, the lanthanide phosphate is substantially unavailable to algae.]

One method of forming lanthanide particles in the pool filter disclosed in our prior patent was to introduce lanthanum chloride into the filter as an aqueous solution or in particulate form causing lanthanum carbonate and lanthanum phosphate particles to be precipitated onto the filter media by reaction with carbonate and phosphates in water contained in the filter. Circulation of water through the filter then converts the lanthanum carbonate in the filter to lanthanum phosphate, which can be removed by normal backwashing.

We found, however, that the addition of soluble lanthanum salts like lanthanum chloride to the pool filter resulted in lanthanum solution being carried through the filter into the body of pool water so as to cloud the pool. Moreover, where a freshly backwashed sand filter is used, some lanthanum phosphate and carbonate particles that precipitate in the filter can also be carried though the filter media into the pool, adding to pool turbidity. Though the degree of turbidity was less than if the lanthanum chloride had been mixed directly into the bulk of the pool water, it was thought to be undesirable. An alternative method of adding lanthanum chloride to pool water was disclosed in international patent application WO 00/24680 by Zodiac Pool Care, Inc, where a lanthanide halide salt was dispersed in a high molecular weight polymer carrier located in the filter outlet. However, even the slowed release of lanthanum chloride increases pool turbidity.

Our prior patent disclosed methods and compositions that mitigated the above problem by incorporating the finely-divided particulate lanthanide compounds in a carrier that facilitated their retention in a pool filter and even allowed mixing into the bulk of the pool water without significant cloudiness. Products of this type are marketed in Australia and the US by LoChlor under the trademark "Stalver". It is to be noted that loading the Zodiac composition (WO 00/24680) into the pool filter does not eliminate the pool clouding problem, increases the filter back-pressure and reduces the amount of active material that can be introduced into the filter at one time.

International patent application WO 01/62673 (published 30 Aug. 2001) by Natural Chemistry, Inc (licensees of the present applicants) disclosed the use of particulate lanthanum sulphate, which is also substantially insoluble (about 50 grams per liter) in pool water. Lanthanum sulphate particles within the filter are first converted into lanthanide carbonate and then into lanthanum phosphate as water is circulated. However, the calcium sulphate also forms in the filter as the water is circulated. This adds to the volume of particulate material retained in the filter, increases filter pressure and limits the amount of lanthanide that can be added to a given filter at one time. It also appears that calcium from the pool water forms a calcium sulphate coating on the lanthanum sulphate particles in the pool filter thereby reducing their phosphate reactivity. This can be a problem in many areas of the US and Australia where waters are 'hard' and have high levels of calcium, where pool water hardness has been incidentally increased by the use of calcium hypochlorite or where pool water hardness has been purposefully increased by the addition of calcium chloride. Moreover, the formation of calcium sulphate is exacerbated by the common use of sodium hydrogen sulphate to decrease the pH of pool water.

Thus, on the one hand, virtually any amount of dissolved phosphate can be removed from pool water by mixing a single dose of lanthanum chloride directly into the pool at the cost of (i) unacceptable pool turbidity, (ii) very slow removal of the precipitated lanthanum phosphate from the water via the filter and (iii) greater risk of excessive filter pressure occurring during the long filtration periods required. But, on the other hand, loading the filter with lanthanide compounds has, hitherto resulted in (i) fine particles being carried through the filter to cause turbidity in the pool, (ii) deactivation of the lanthanide compounds while in the filter, and/or (iii) undesirable limitation of the dose size due to increased filter pressure.

OBJECTIVE OF THE INVENTION

Accordingly, it is an objective of the invention to provide methods and compositions for removing phosphate from pool water that will mitigate one or more of the problems of the prior art outlined above.

OUTLINE OF THE INVENTION

The present invention is based upon the discovery that the use of lanthanide carboxylates offers substantial advantages over the art. It has been found that unacceptable pool turbidity can be avoided when compositions comprising selected lanthanide carboxylates are loaded into pool filters, without unacceptably increasing filter pressure. Though it is preferable to use lanthanide carboxylates that are substantially insoluble, it has been found that more soluble particulate lanthanide particulates can be used with satisfactory results. Indeed, we found that selected lanthanide carboxylate solutions can be added to the inlet of the pool filter or to the bulk of the pool water without generating the unacceptable pool turbidity typically associated with the addition of lanthanum chloride solutions. Further, and also surprisingly, we have found that the rate of removal of phosphate from a pool using selected lanthanide carboxylates can exceed that obtained when lanthanide solutions or when lanthanum sulphate particulates are used.

The explanation for these improvements is not very clear to us, but it appears to be two-fold. First, we surmise that carboxylate modifies the surface properties of the fine lanthanide carbonate and/or phosphate particles so that they clump together and are effectively retained in the filter. This explanation is supported by the observations that (i) the material which is backwashed from an otherwise clean sand filter has a fluffy or flocked appearance, while that backwashed from one that has been loaded using lanthanum chloride has a milky appearance and (ii) the lack of pool turbidity. It is also apparent that suitable lanthanide carboxylates do not form insoluble compounds with calcium ions in the water, thus permitting faster and more complete reaction of the lanthanide and dissolved phosphate. On the hand, we have found that suitable carboxylates inhibit the precipitation of lanthanide carbonate (and the associated turbidity) while allowing the precipitation of lanthanide phosphate (and its subsequent removal by the pool filter).

The lanthanide carboxylates may be supplied and/or used in particulate form as granules, powders, or crystals, in the form of slurries or aqueous suspensions of fine particulate material, or they may even be supplied and used as aqueous solutions.
Particulates Lanthanum carboxylates are preferred over other lanthanide carboxylates due to the relatively low cost and wide commercial availability of lanthanum precursor compounds (such as lanthanum chloride), the low solubility of lanthanum carbonate and phosphate and the stability of the $La^{3+}$ ion in water. Mineral extracts containing compounds of the lighter lanthanides (lanthanum to samarium; atomic numbers 57 to 62) may be used, as they can be cheaper, but are preferably depleted of cerium. The heavy lanthanides (yttrium and holmium to ytterbium; atomic numbers 39 and 67 to 70) are least preferred due to their tendency to form carbonate complexes, which are substantially more soluble than the light lanthanide carbonates.

The carboxylic anions preferably have molecular mass less than 500 and fewer than 8 carbon atoms per anion. Low molecular mass is preferred to ensure a higher mass proportion of lanthanide ion in the compound and fewer carbon atoms per molecule is preferred to minimise to consumption of oxidising substances (such as chlorine) when added to sanitised water. Also, since calcium forms relatively soluble compounds with certain low molecular weight carboxylates, the problem of increased filter backpressure due to the accumulation of insoluble calcium compounds is avoided. The carboxylic anions may be simple mono-carboxylates (anions of fatty acids) such as formate ($HCOO^-$), acetate ($H_3CCOO^-$) and the like. However, the lighter of these anions tend to be too soluble for successful particulate products. On the other hand, di-carboxylates such as oxalate, malonate and the like ($^-OOC-(CH_2)_n-COO^-$), the hydroxy-dicarboxylates such as tartrate and the tri-carboxylates such as citrate, tend to be too insoluble.

Of the many species of carboxylate, the light hydroxy-mono-carboxylates such as glycolate (hydroxyacetate, $CH_2OH-COO^-$) and lactate (hydroxypropionate, $CH3-CHOH-COO^-$) are most preferred. They are readily formed by mixing appropriate lanthanide salts and hydroxy-mono-carboxylic salts or acids together and the reaction can be readily controlled to provide appropriately sized crystals and aggregates. The solubility of the light lanthanide, light hydroxy-mono-carboxylates is typically about 3 grams per liter. When supplied as particles having a size range of from 1 to 1,000 microns, more preferably 10 to 200 microns and most preferably from 20 to 50 microns, the particles are readily retained by most filter media and dissolve slowly to form lanthanide carbonate and phosphate without forming calcium or magnesium solid phases in the filter. The lanthanide carbonate and phosphate is substantially all retained in the filter thereby not producing significant turbidity in the main body of the pool. The lanthanide carbonate retained in the filter remains reactive towards phosphate.

A preferred method of making particulate lanthanum glycolate is to mix a 50% weight/volume solution of lanthanum chloride hepta-hydrate of around pH 5 with a substantially stoichiometric amount of a 70% weight/volume solution of sodium glycolate of around pH 8 according to the formula:

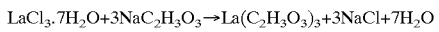
$LaCl_3.7H_2O+3NaC_2H_3O_3 \rightarrow La(C_2H_3O_3)_3+3NaCl+7H_2O$

When mixed at 20° C., the result is a super-saturated solution which slowly crystallises over several hours and the crystals aggregate typically to irregular particles around 10 to 50 microns in diameter. When mixed at elevated temperatures of between 30° and boiling crystallisation occurs more rapidly with the production of larger more clearly defined crystals. For example, at 80° C. crystallisation occurs over several minutes producing particles around 10 to 30 microns. Although not clear to us, it may be the case that higher temperatures result in the dissociation of glycolate dimers and faster formation of lanthanum glycolate crystals. Glycolic acid or mixtures of glycolic acid and sodium glycolate may be used although the yield of lanthanum glycolate is reduced. A similar method may be used to make lanthanum lactate although production of crystalline lanthanide lactate requires more careful control of pH and temperature.

The lanthanide carboxylate material may be conveniently supplied and used as aqueous suspensions, or the suspensions can be dewatered and dried and supplied as granules or fine powders.

In one method of use, the material is added directly to the main body of the pool water. Preferably the particles are smaller than 5 microns and composed of a less soluble lanthanide carboxylate such as lanthanum malate (lanthanum mono-hydroxy-succinate, solubility about 0.1 grams per liter). These particles are sufficiently fine that they remain suspended in the water for several hours while adhering lanthanum carbonate and phosphate forms around the particles. While still producing some turbidity, it is substantially less than occurs with the use of more soluble lanthanide salts, such as lanthanum chloride.

In a preferred method, powdered or granular lanthanide carboxylate, either dry or as a preformed aqueous suspension, is introduced into a filter or other absorber which retains particulate lanthanide carboxylate. The most convenient method of doing this for a swimming pool is to add the material to the water passing into the pool skimmer. Generally speaking, larger particle sizes minimise turbidity while smaller particle sizes increase phosphate reactivity. Also higher particle solubility increases turbidity and increases phosphate reactivity while lower particle solubility decreases turbidity and decreases phosphate reactivity. Further, fine filter media like diatomaceous earth is associated with decreased immediate turbidity while coarser media like sand is associated with increased immediate turbidity. In general, finer, faster-reacting lanthanide carboxylic materials can be used with fine filter media while coarser more slowly reacting lanthanide carboxylic materials can be used with coarser media. However, it has been found that lanthanum glycolate or lanthanum lactate particles (which are substantially insoluble) with a size range from about 10 microns to 100 microns provide satisfactory phosphate reactivity while minimising turbidity when used with both diatomaceous earth and sand (1 mm) filters.

Thus, from one aspect, the invention comprises a method of removing phosphate from filtered water by contacting the water with particulate lanthanide carboxylate. The water may be recirculated filtered water, for example swimming pool water. The particulate lanthanide carboxylate is preferably lanthanide hydroxy-mono-carboxylate and even more preferably lanthanide glycolate or lanthanide lactate and most preferable lanthanum glycolate or lanthanum lactate. Preferably the lanthanide carboxylate is substantially insoluble and is loaded into the filter as particles with a size between 1 and 1,000 microns, more preferably between 5 and 200 microns and most preferably between 20 and 100 microns.

Solutions

As already noted, some mono, di and tri carboxylates are too soluble or insoluble for use as particulate products for loading a filter. However, some of the soluble carboxylates are suitable for addition to the bulk of the pool water, either by passage through the filter, by adding them to the skimmer box with the pump on and the filter by-passed or by direct addition to the pool water. Others can be rendered soluble by suitable adjustment of pH or by other chemical modification.

For example, in neutral aqueous solutions, mixing stoichiometrically equivalent amounts of lanthanum chloride and sodium citrate causes the formation of lanthanum citrate flocs or gels that are of little value as a particulate product for filter loading or as a 'solution' for adding direct to pool water. However, raising the pH to about 10 will result in a clear solution, presumably containing lanthanum hydroxy-citrate anions, that can be added to low-phosphate pool water containing normal amounts of carbonate without significant clouding or filter blocking. Alternatively, at near neutral pH, mixing a lanthanum chloride solution with a stoichiometric excess of sodium citrate solution results in a clear stable solution. However, the excess citrate may be more expensive than the sodium hydroxide required to produce a clear solution. As phosphate is slowly added to the pool by various means, such as use of the pool by people or the accumulation of garden detritus, lanthanum phosphate forms, the resultant clouding is tolerable and removable by normal filtering. Clear stable solutions suitable for commercial distribution and containing up to 200 g/l of lanthanum hydroxy-citrate can be readily made, for example, by simply mixing lanthanum chloride, citric acid and sodium hydroxide solutions. A clear solution also results from lowering the pH of a lanthanum citrate suspension to below about pH 2 or simply by mixing lanthanum chloride and citric acid solutions. However, this acid solution can significantly lower the pH of the pool water.

As another example, in neutral solutions, mixing stoichiometric equivalent amounts of lanthanum chloride and sodium tartrate results in precipitates of lanthanum tartrate. By mixing in excess sodium tartrate, the lanthanum tartrate can be redissolved presumably due to the formation of anionic lanthanum tartrate species. However when added to pool water lanthanum carbonate does form. Presumably, tartrate does not form sufficiently strong complexes with lanthanum to prevent the precipitation of lanthanum carbonate. In this regard, the tartrate is less desirable than the citrate.

Other soluble and partially products of this nature can be selected from the lanthanide amino-carboxylates acids such as lanthanum ethylene di-amino tetra-carboxylate (LaEDTA) and lanthanum nitrilo-tri-acetate (LaNTA). However, some of these chelates are sufficiently stable that not only is precipitation of lanthanide carbonate prevented but precipitation of lanthanide phosphate is less efficient.

Accordingly, from another aspect, the present invention comprises a composition for use in reducing the concentration of solvated phosphate in chlorinated swimming pool water, the composition comprising an aqueous solution of a lanthanide carboxylate characterised in that, when added to swimming pool water (directly or via the pool filter or circulatory system), it preferentially precipitates lanthanum phosphate relative to lanthanum carbonate. Preferably, the composition is such that, when added to normal swimming pool water having a phosphate composition of less than 10 ppb, no significant cloudiness or turbidity (caused by the precipitation of lanthanum carbonate) will result.

From another aspect, the invention comprises a method of producing a composition for treating swimming pool water comprising the steps of complexing a lanthanide with a carboxylate in an aqueous solution to inhibit reactivity of the solution with solvated carbonate in pool water while not significantly inhibiting reactivity of the solution with solvated phosphate in pool water.

From another aspect the invention comprises a method of treating swimming pool water to precipitate phosphate therein, comprising the step of contacting the pool water with an aqueous solution of a lanthanum carboxylate in which the lanthanum moiety is complexed by the carboxylate moiety so that it is rendered substantially unreactive with respect to dissolved carbonate in the pool water while remaining reactive with respect to dissolved phosphate in the pool water.

DESCRIPTION OF DRAWINGS

In the following illustrative examples, reference will be made to the accompanying drawings in which.

EXAMPLES

Example 1

Preparation of Lanthanum Glycolate

Figure 1:
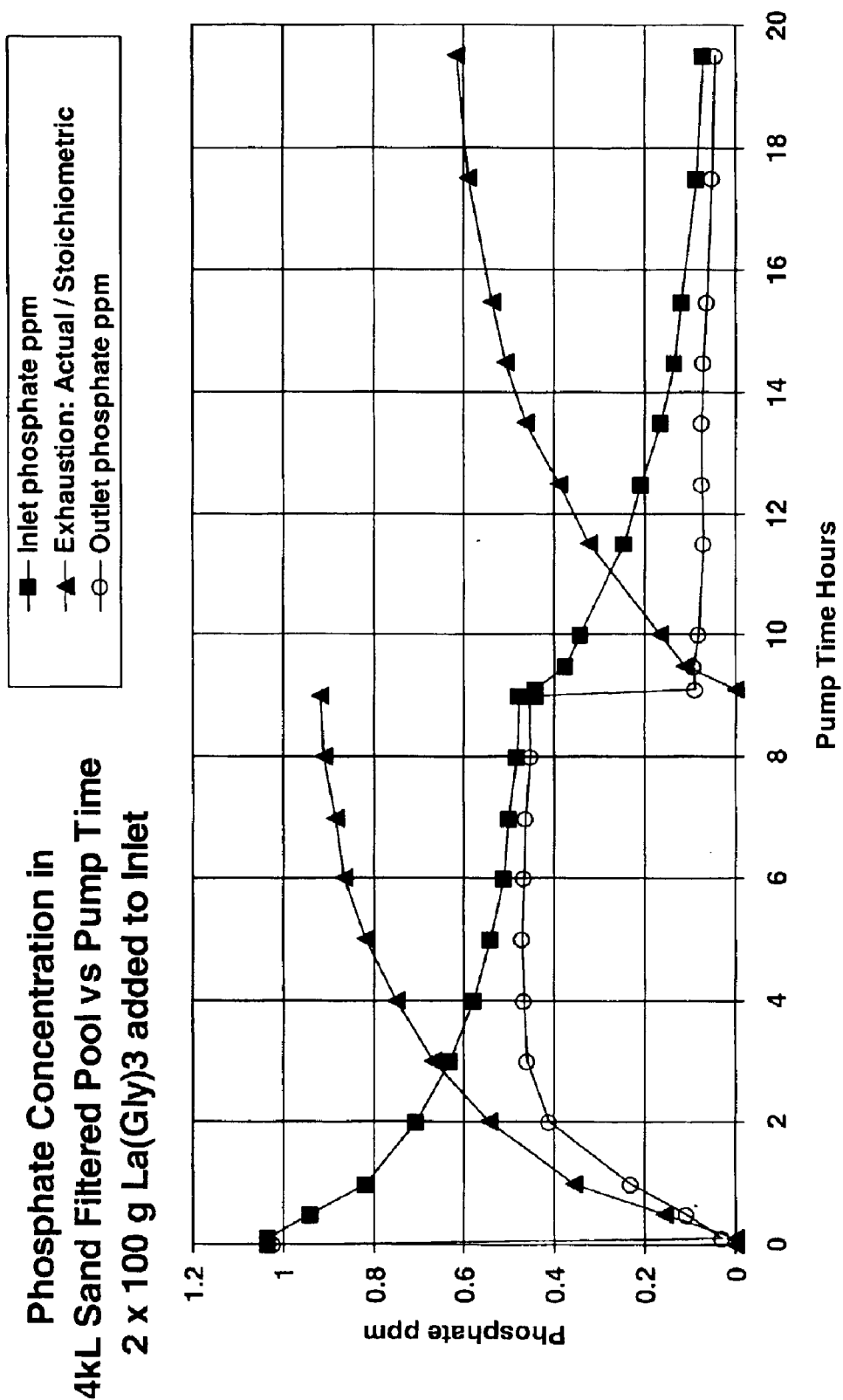
FIG. 1 is a graph depicting the rate at which phosphate was removed from a swimming pool by using two spaced doses of particulate lanthanum glycolate in the pool filter in accordance with Example 5.

Particulate lanthanum glycolate was made by several different methods. In one method, 102 grams of lanthanum chloride hepta-hydrate granules were dissolved in 90 ml of commercial grade 70% weight/volume glycolic acid of density 1.244 g/l at 15° C. for 8 hours with gentle stirring for a yield after of 70 grams of lanthanum glycolate with a particle size range of 10 to 50 microns. In another method, 90 ml of 70% glycolic acid was reacted with 39 grams of sodium hydroxide to increase the pH from around 2.1 to 7.0. This was gently mixed at 20° C. for 8 hours with 200 ml or 50% weight/volume lanthanum chloride hepta-hydrate for a yield of 88 grams of lanthanum glycolate with a particle size range of about 15 to 40 microns. In other methods the solutions of the previous methods were heated to 80° C. before mixing and the combined solution was gently stirred for 30 minutes for a yield of 94 grams of lanthanum glycolate with a particle size range of 5 to 30 microns. The resultant suspensions were found to be highly reactive to dissolved phosphate in chlorinated pool water and to be retained satisfactorily by pool filters.

Example 2

Use of Lanthanum Glycolate

A swimming pool fitted with a sand filter (0.2 m$^2$ cross section area and 0.6 m sand depth) and 0.75 kW electric centrifugal pump delivering 4 l/s at a pressure of 72 kPa was filled with 40 kl of fresh tap water (pH 7.8 alkalinity, 50 ppb phosphate, 80 ppm $CaCO_3$ equivalent and 120 ppm calcium hardness equivalent) and chlorinated to 3 ppm with "trichlor" sticks in the skimmer. A solution containing about 18.5 g phosphate was made by dissolving 26.5 g potassium dihydrogen phosphate in 200 ml of hot water. The filter system was set to recirculate (water passing from the pool through the skimmer and pump and back into the pool without passing through the filter). The pump was switched on and the phosphate solution was dripped into the skimmer over 30 minutes. After a further 1 hour phosphate analysis using the molybdenum blue stannous chloride method gave a phosphate concentration as 510 ppb. The pump was switched off, the filter system was switched to filter and the pump was switched back on.

At this stage, the underwater visibility (a measure of turbidity) was checked and found to be greater than 8 m as determined by the distance a the pattern of a finely detailed black and white chequered target could be clearly seen under water. In previous tests in which 100 g lanthanum chloride was added rapidly to the skimmer, turbidity reduced visibility of this target to less than 2 m.

The pool pump was started again and 100 g of the mixed lanthanum glycolate from the previous example was mixed together with 500 ml pool water and then quickly poured into the pool skimmer. After 15 seconds, a barely observable amount of material passed into the pool from the filter outlet. After 30 minutes the visibility was reduced to 7.5 m. Visibility remained the same for 4 hours then increased to greater than 8 m (the longest under water distance in the test pool). After 8 hours of pumping, the phosphate concentration had decreased to 230 ppb and after 24 hours to 90 ppb. A small amount of sediment visible on the bottom of the pool was vacuumed up without a noticeable effect on under water visibility. Filter pressure remained at 72+/−2 kPa throughout.

Example 3

Preparation and Use of Lanthanum Lactate

Particulate lanthanum lactate (simplified formula $La(C_3H_5O_3)_3$) was made by dissolving 90 grams of 80% lactic acid powder in 200 ml of water at 80° C. and neutralising the solution with fine solid sodium hydroxide then mixing the solution with another solution formed by dissolving 102 g lanthanum chloride hepta-hydrate granules dissolved in 200 ml water at 80° C. The combined solution was gently stirred for 30 minutes for a yield of 106 g lanthanum lactate with a particle size range of 10 to 40 microns. Again the resultant suspension was found to be highly reactive to dissolved phosphate in chlorinated pool water and to be retained satisfactorily by pool filters.

After vacuuming the pool and backwashing the filter, the previous example was repeated except that 100 grams of lanthanum lactate were substituted for the lanthanum glycolate. Essentially results identical to the previous example were obtained.

Example 4

Preparation of Lanthanum Glycolate

In another example, chemically equivalent amounts of neutralised glycolic acid and lanthanum chloride were mixed at 50° C. to form lanthanum glycolate crystals with a narrow particle size range averaging about 20 microns. The glycolic acid (70% wt/wt water) was neutralised with sodium hydroxide at a rate to ensure that the resultant temperature was between 50° and 60° and that boiling did not occur during neutralisation. Lanthanum chloride solution of about 48% wt/wt water was then added slowly to the hot neutralised glycolic acid solution while stirring. The rate of addition in this case was kept between 100 ml and 200 ml per minute while the temperature was maintained at about 50° C. The resultant precipitate was separated from the liquor, dried and confirmed by analysis to be substantially lanthanum glycolate.

Example 5

Comparative Trial of Lanthanum Glycolate and Lanthanum Chloride

A clean swimming pool of 44 kl having a freshly loaded diatomaceous earth filter was dosed with potassium phosphate until the level of dissolved phosphate in the pool water stabilized at near 1 ppm, representing a total phosphate content of 44 g in the pool. The pump was operated to circulate water through the filter and the filter pressure was measured at 72 kPa (red-line at 120 kPa). Underwater visibility was judged to be better than 8 m.

The theoretical amount of lanthanum glycolate required to remove this amount of phosphate was then calculated to be 165.9 g [44 g×357.99/94.97]. Two doses of 100 g each were weighed from the batch made as just described. Referring now to the graphs of FIG. 1, the first 100 g dose was mixed with 1000 ml water to form dilute slurry and added to the filter intake at time 0 with the filter pump running and the filtered water being recirculated to the pool. The pool water clarity and filter pressure were checked immediately after the addition of the first dose and found to be better than 8 m visibility and about 75 kPa (respectively). The pump was left on to keep the pool water circulating though the filter, the pool water entering and leaving the filter was sampled at about 45–50 minute intervals and the phosphate concentration in each sample measured.

The logarithmic reduction in the phosphate concentration at the inlet during about 9 hours of filtering is evident from FIG. 1. It will also be seen from FIG. 1 that removal of phosphate from water passing through the filter was initially very effective but that, after about 3 hours, the rate of phosphate removal fell away as the first dose was exhausted. Similarly, the rate of dose exhaustion falls off significantly after 3 hours as the inlet phosphate concentration levels off. The plot of dose exhaustion as the ratio of the actual exhaustion to the theoretical or stoichiometric exhaustion is significant mainly because it shows that about 90% of the dose has been used to remove phosphate after 9 hours of filtering. In other words, removal efficiency of the initial dose can be said to be about 90%.

After 9 hours, the second 100 g dose of lanthanum glycolate was mixed with 1000 g of pool water and poured into the skimmer box. It will be noted that, at this time, the phosphate concentration in the pool had been reduced to a little below 0.5 ppm and that the second dose was more than required to remove the remaining phosphate. Again, the phosphate concentration of the filter outlet water was immediately reduced; this time to about 0.1 ppm. As before, the phosphate concentration in the filter inlet water was reduced logarithmically with time, but at a lower rate than with the first dose because of the depletion of phosphate in the pool water. Note, however, that the phosphate concentration halving time of the two batches is substantially similar. After a little over 19 hours of filtering the inlet phosphate concentration (effectively the pool phosphate concentration) had been reduced to about 0.05 ppm. The dose exhaustion curve flattens off to a ratio of 0.6 [actual over theoretical phosphate removal], indicating that about 40% of the lanthanum of the second dose remains unreacted.

At the time each sample was taken the clarity of the pool water and the filter pressure were also checked. No deterioration in the clarity of the pool water was detectable, either immediately after the addition of the glycolate or at any later time during the trial, indicating that no appreciable glycolate particles or dissolved lanthanum ions had passed through the filter. No rise in filter pressure above 75 kPa was observed, care being taken to ensure that the inlet to the filter was well screened.

Figure 2:
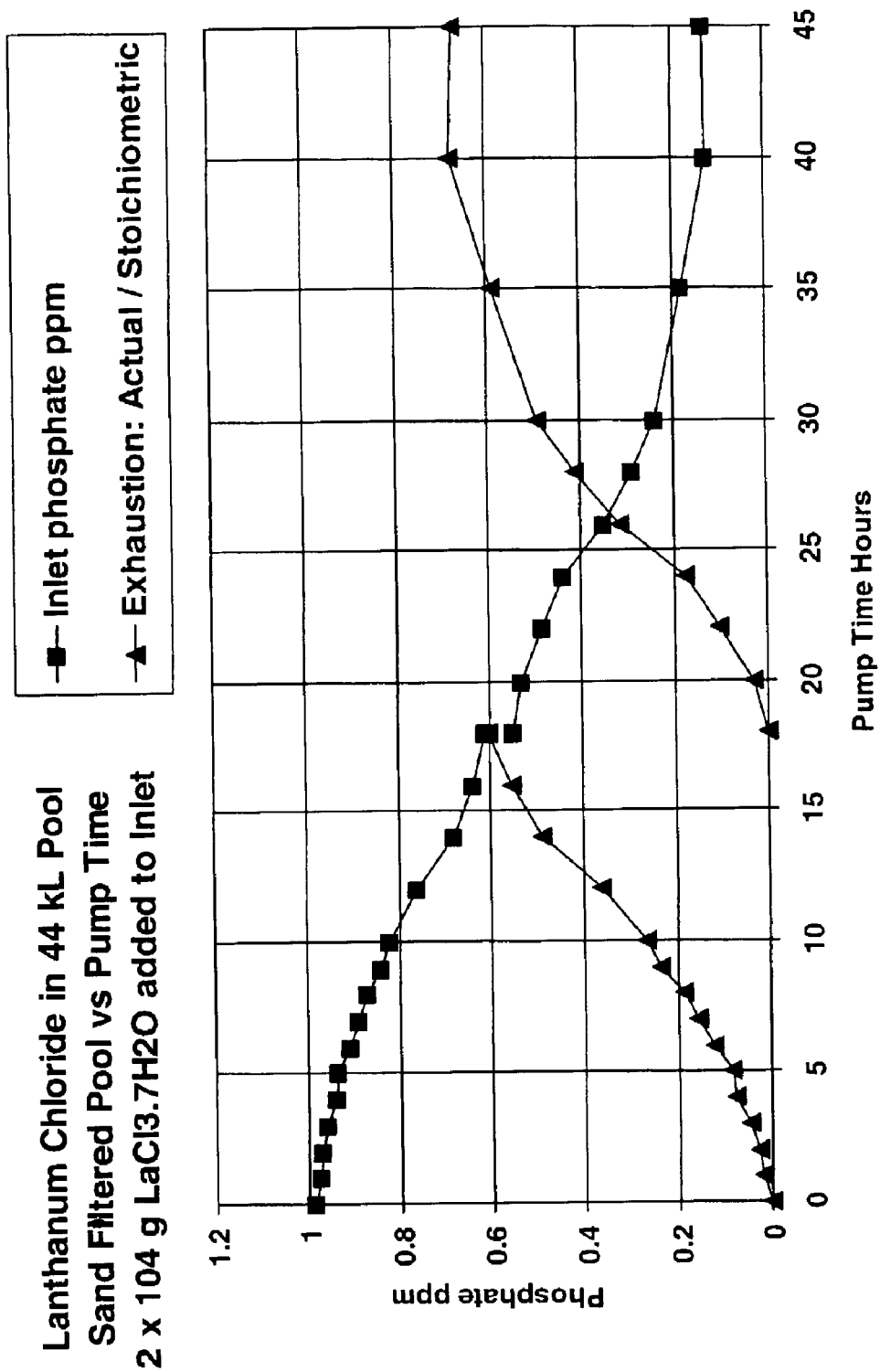
FIG. 2 is a graph depicting the rate at which phosphate was removed from the same swimming pool as in FIG. 1 by using two equivalent spaced doses of lanthanum chloride solution in accordance with Example 5.

For the purpose of comparison, the equivalent test using two doses of lanthanum chloride was carried out in the same pool using the same filter and the results are illustrated in FIG. 2, the equivalent dose of lanthanum chloride being 104 g. In this case, however, the phosphate concentration at the filter outlet was not measured.

Within a few hours of the addition of the first dose, the pool became unacceptably cloudy and remained so for the whole of the test. This indicated that most of the lanthanum had immediately passed through the filter as the carbonate or as the phosphate, though some of both fine precipitates would have certainly been retained in the filter. Measurement of inlet phosphate concentration was conducted after adding 1 ml of concentrated hydrochloric acid to 250 ml samples.

After 18 hours of pumping, the inlet phosphate concentration had not reached the 0.5 ppm level achieved after 9 hours of pumping with the glycolate test of FIG. 1. The dose exhaustion curve shows that only about 60% of the dose had been effective at that time. Pool clarity, though still unacceptable, had noticeably improved. At 18 hours, the second dose of lanthanum chloride was added to the filter inlet and the measurement of inlet phosphate concentration resumed. Within a few minutes the clarity of the pool water returned to much the same unacceptably high level reached after the addition of the initial dose. After 40 hours of pumping, the inlet phosphate concentration had still not been reduced to the level achieved in the glycolate test and the dose exhaustion was still less than 70%. Though the clarity of the pool water had again improved, it was still unacceptable.

The slow removal of phosphate by lanthanum chloride may seem surprising because of its known reactivity with respect to dissolved phosphate. It can be readily understood, however, if it is appreciated that a significant proportion of the lanthanum chloride reacts with dissolved carbonate and that the second-stage conversion of the carbonate to the phosphate takes place at a much lower rate than the direct reaction of the lanthanum chloride with the dissolved phosphate because the lanthanum carbonate is taken out of solution. Further, the rate of formation of particles of lanthanum carbonate and phosphate large enough to be removed by filtration is slow. This effect is particularly noticeable for the second dose where the phosphate concentration has been significantly reduced but the carbonate concentration will be essentially unchanged.

Example 6

Preparation of a Lanthanum Citrate Solution

A sodium citrate solution was formed by dissolving 59 g citric acid in 500 ml water and then adding 37 g sodium hydroxide dissolved in 50 ml water. The temperature increased from 20 to 50° C. 113 g lanthanum chloride heptahydrate dissolved in 200 ml of warm water was then mixed into the sodium citrate solution and resulted in the formation of a dense gelatinous floc or gel of lanthanum citrate. While the solubility of the citrate was not measured, it was inferred to be about 0.01 g/l. Such a gel is clearly not suited for addition to the filter as it is likely to raise the pressure drop excessively. Nor is it suitable for addition to the bulk of the pool water because it would be unsightly and disperse slowly.

However, the addition of about 1 to 2 moles of sodium hydroxide per mole of lanthanum resulted in a clear solution of about pH 10 that could be added to the skimmer while filtering or to the bulk of the pool water without problem. It is likely that the electrically neutral lanthanum citrate has been changed to the electrically charged lanthanum hydroxy citrate. Remarkably, the addition of carbonate to this solution does not form a lanthanum carbonate precipitate, but the addition of phosphate does form a lanthanum phosphate precipitate.

Example 7

Use of Lanthanum Citrate Solution

The clear lanthanum citrate solution was added to the filter intake of a chlorinated 50,000 l pool with a phosphate concentration of about 100 ppb. No rise in filter inlet pressure was noted, suggesting that little additional particulate material had formed in the filter. A slight, but acceptable, reduction in visibility from better than 8 m to about 6 m was noted, no doubt due to the precipitation of lanthanum phosphate. Visibility was returned to about 8 m after 12 hours of filtering. The concentration of phosphate in the pool water was then measured and found to be less than 10 ppb.

The filter valves were then operated to make the circulating water by-pass the filter and 20 g of neutralised phosphoric acid in 1 L water was added to the water intake to raise the pool phosphate concentration to close to 500 ppb. Again, visibility fell to about 6 m but this was reduced to about 8 m with a further 12 hr filtering. The resulting phosphate concentration was found to be about 150 ppb. After a further 24 hours filtration the phosphate was about 15 ppb. The pool was then left unused for a period of one month during a hot Australian summer and fully exposed to sunlight, though chlorine concentration was maintained (using "Tri-chlor" sticks) at about 1 ppm and the pool was filtered for about 2 hours per day. At the end of this period, no noticeable algal growth had occurred and the phosphate concentration was found to be less than 10 ppb. Pool clarity was kept better than 8 m throughout the entire period.

The above example demonstrates that the addition of a lanthanum citrate solution to a swimming pool, having a low initial phosphate concentration, can have a unique and valuable 'prophylactic' effect. That is, it will serve to mop-up and remove phosphate that accumulates in the pool during normal use or by blown or falling biological material.

While a variety of examples have been described that show significant advantages over the compositions and methods of the prior art, it will be appreciated that many changes to these examples are possible and that many other examples could have been devised without departing from the scope of the invention as claimed.

What is claimed is:

1. A method of forming a lanthanide particulate composition for addition to filter media of swimming pool filters to effect the removal of dissolved phosphate from pool water circulated through the filter, the method comprising:

reacting, at an elevated temperature between ambient and boiling, an aqueous solution of a lanthanide compound with an aqueous solution of a hydroxy-mono-carboxylate ion having between 2 and 5 carbon atoms and having a molecular mass of less than 500, and allowing or causing the precipitation of lanthanide carboxylate particles of between 1 and 2000 micron in size and a solubility in pool water at normal temperature and pressure of less than 10% by weight.

2. A method of forming a lanthanide particulate composition for addition to the filter media of swimming pool filters to effect the removal of dissolved phosphate from pool water circulated through the filter, the method comprising:

reacting, at an elevated temperature between ambient and boiling, an aqueous solution of a lanthanide compound with an aqueous solution of a carboxylate ion having fewer than 5 carbon atoms and having a molecular mass of less than 500, said carboxylate ion provided by a glycolic acid or a glycolate, and allowing or causing the precipitation of lanthanide carboxylate particles of between 1 and 2000 micron in size and a solubility in pool water at normal temperature and pressure of less than 10% by weight.

3. A method of forming a lanthanide particulate composition for addition to the filter media of swimming pool filters to effect the removal of dissolved phosphate from pool water circulated through the filter, the method comprising:

reacting, at an elevated temperature between ambient and boiling, an aqueous solution of a lanthanide compound with an aqueous solution of a carboxylate ion having fewer than 5 carbon atoms and having a molecular mass of less than 500, said carboxylate ion provided by a lactic acid or lactate, and allowing or causing the precipitation of lanthanide carboxylate particles of between 1 and 2000 micron in size and a solubility in pool water at normal temperature and pressure of less than 10% by weight.

4. The method according to claim 2 or 3 wherein said particles have a particle size between 5 and 200 microns.

5. A method of forming a lanthanide particulate composition for addition to the filter media of swimming pool filters to effect the removal of dissolved phosphate from pool water circulated through the filter, the method comprising:

reacting, at an elevated temperature between ambient and boiling, an aqueous solution of a lanthanum compound with an aqueous solution of a glycolate to produce a reaction product at said elevated temperature, and allowing or causing the precipitation of lanthanum glycolate particles of between 5 and 200 micron in size and a solubility in pool water at normal temperature and pressure of less than 10% by weight.

6. A method of forming a lanthanide particulate composition for addition to the filter media of swimming pool filters to effect the removal of dissolved phosphate from pool water circulated through the filter, the method comprising:

reacting, at an elevated temperature between ambient and boiling, an aqueous solution of a lanthanide compound with an aqueous solution of a citric acid or citrate to produce a reaction product at said elevated temperature, and allowing or causing the precipitation of lanthanum citrate particles of between 1 and 2000 micron in size and a solubility in pool water at normal temperature and pressure of less than 10% by weight.

7. The method according to claim 6 wherein said lanthanide is lanthanum.

8. The method according to claim 6 wherein said particles have a particle size between 5 and 200 microns.

* * * * *